UNITED STATES PATENT OFFICE.

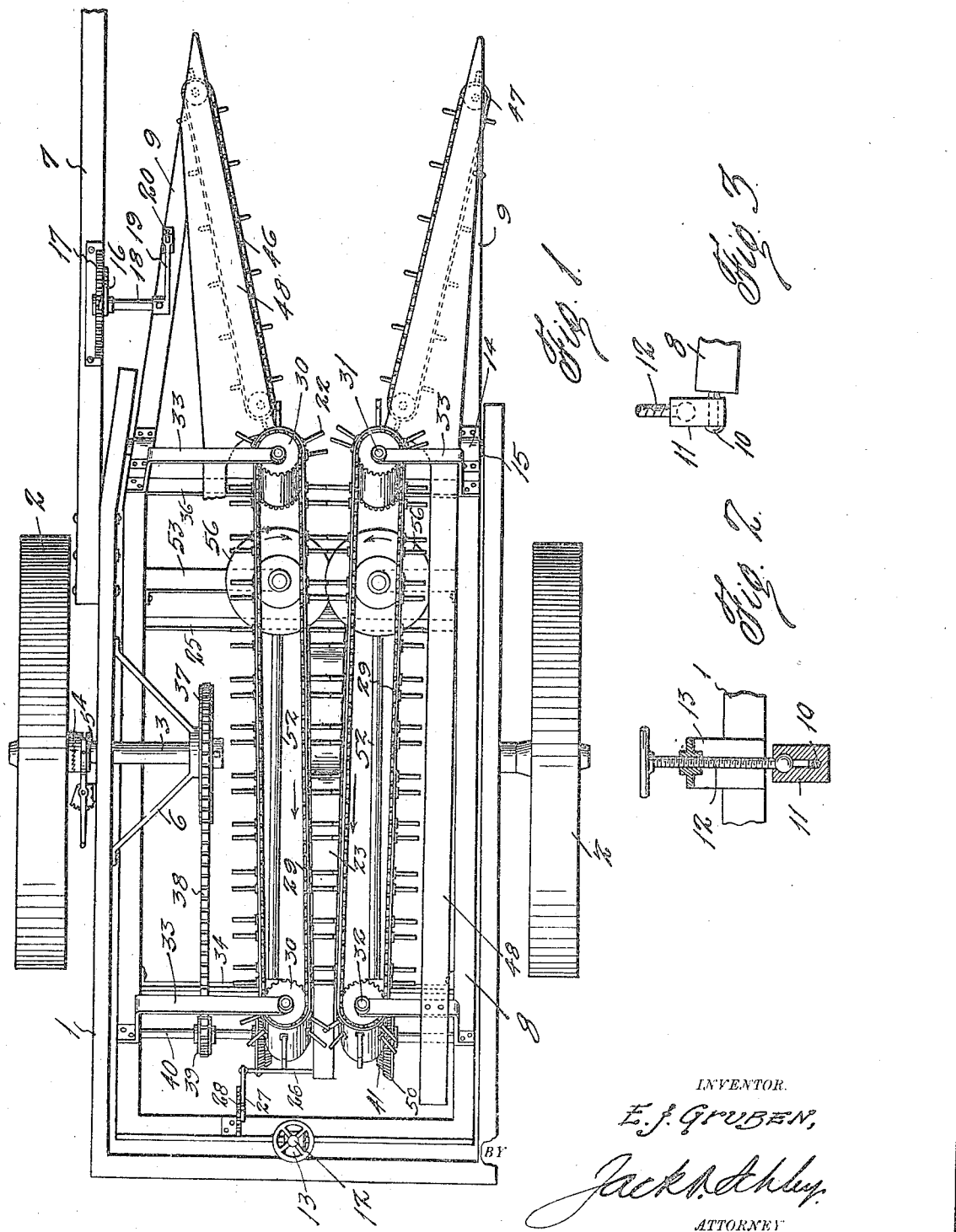

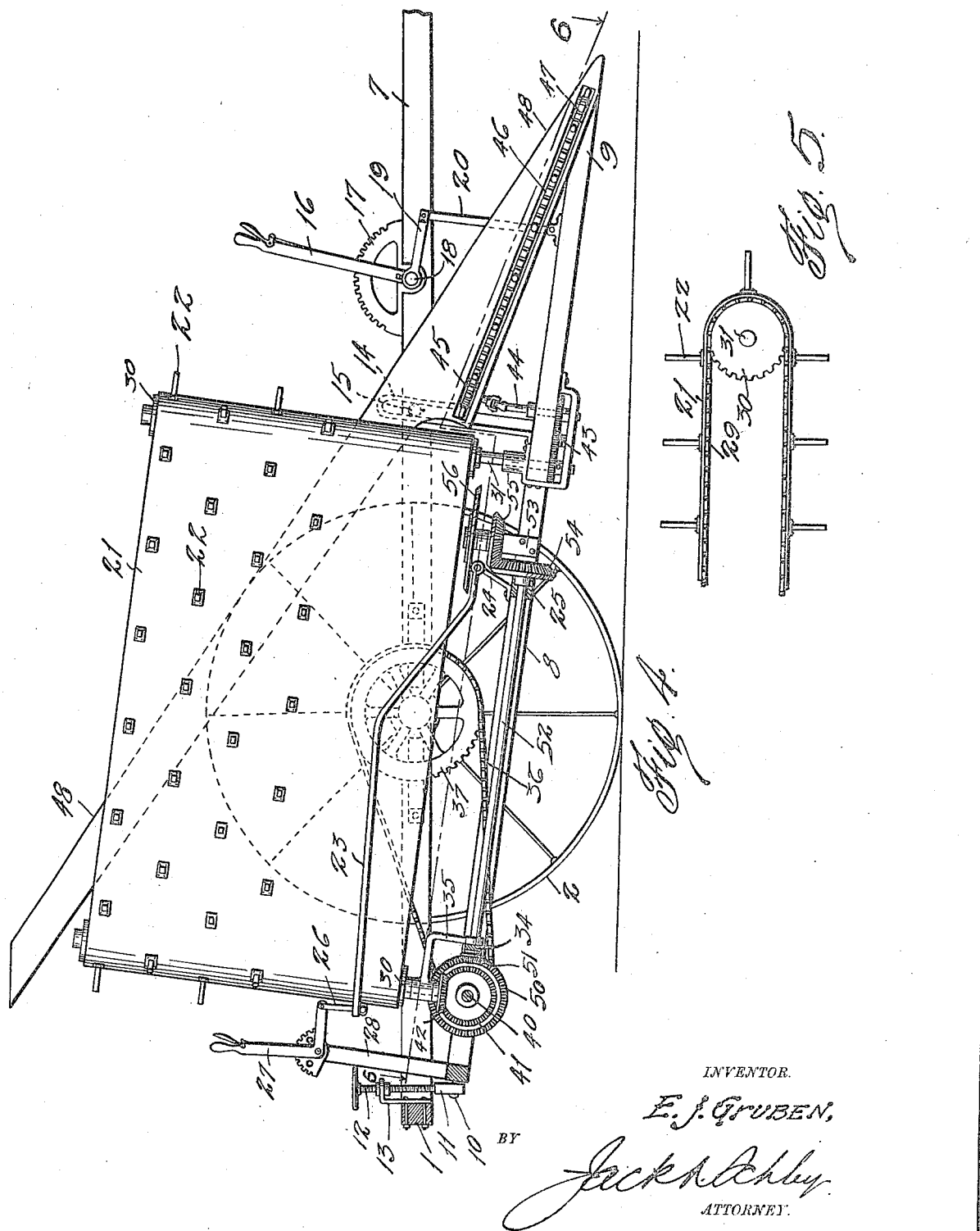

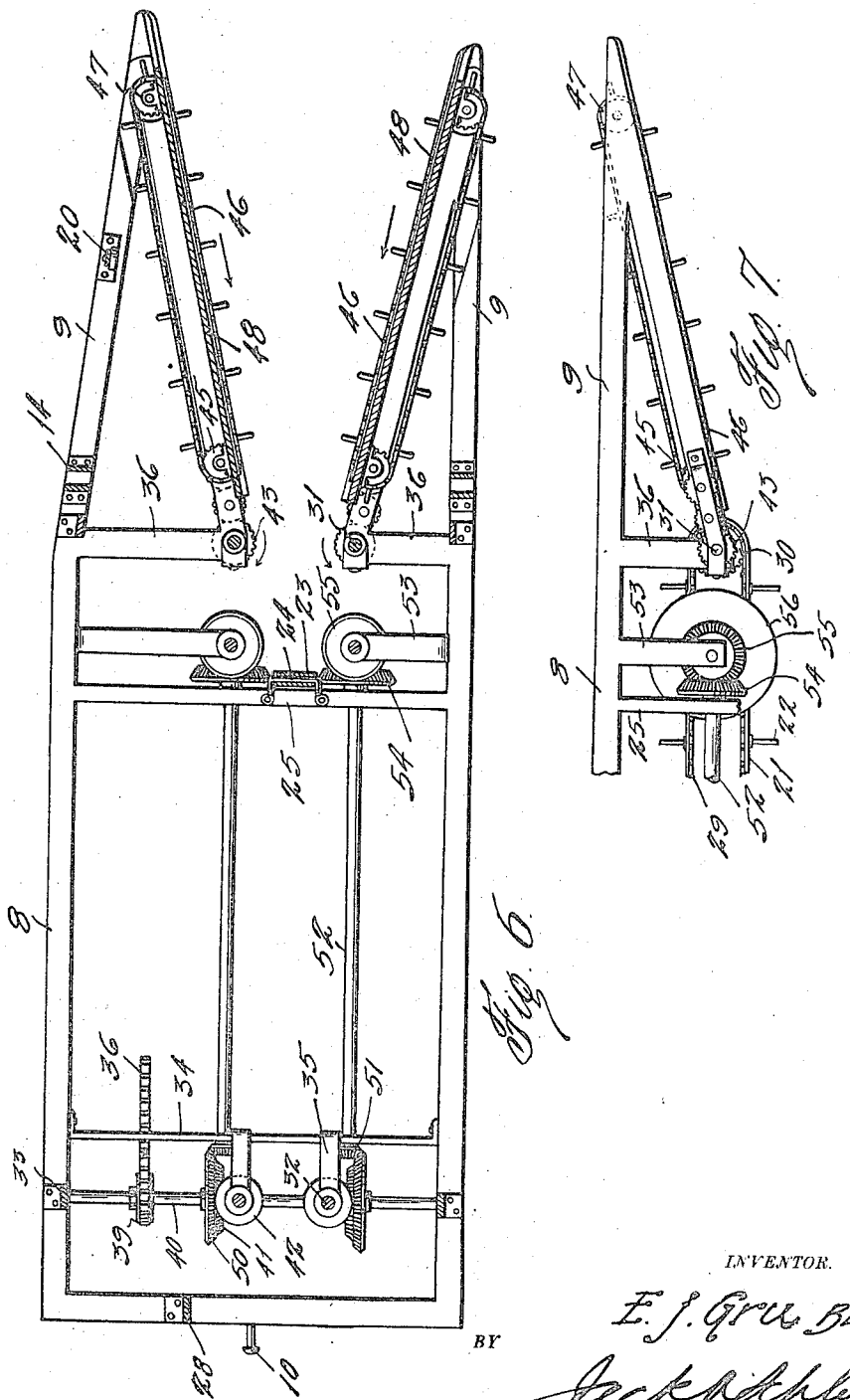

EDWARD J. GRUBEN, OF ROYSTON, TEXAS.

ROW-BINDER.

1,239,685.   Specification of Letters Patent.   Patented Sept. 11, 1917.

Application filed April 17, 1917. Serial No. 162,706.

*To all whom it may concern:*

Be it known that I, EDWARD J. GRUBEN, citizen of the United States, residing at Royston, in the county of Fisher and State of Texas, have invented certain new and useful Improvements in Row-Binders, of which the following is a specification.

This invention has particular relation to the harvesting portion of row binders.

The invention contemplates the embodiment of certain features whereby an improved structure may be had and certain adjustments permitted; together with the use of rotary cutters and adjustable bottom disposed conveyer belts.

The invention will be more readily understood from a perusal of the following specification and by reference to the accompanying drawings, in which an example of the invention is shown and wherein:

Figure 1 is a plan view of a portion of a binder constructed in accordance with the invention, Fig. 2 is a detail of the secondary frame adjuster, Fig. 3 is another detail of the same parts, Fig. 4 is a longitudinal sectional view of the binder, Fig. 5 is a detail of one of the belt chains, Fig. 6 is a cross-sectional view taken on the line 6—6 of Fig. 4, and Fig. 7 is an under side view of one of the throat members.

In the drawings the numeral 1 designates a horizontal main frame which is substantially U-shaped in plan and has its open end forward. This frame is supported by ground wheels 2, one of which is loosely confined on a stub axle 3 and has a clutch hub 4 engaged by a clutch 5 mounted on the axle. The axle has its inner end projecting into the frame and supported in a bracket 6. A tongue 7 is fixed to one side of the main frame.

A secondary frame 8 is suspended within the main frame and carries at its forward end converging throat members 9 which project beyond the main frame. The secondary frame is suspended at its rear central portion by means of a headed pin 10 engaging in a hanger 11 swiveled on the lower end of a vertical screw 12 mounted in a bracket 13 secured on the main frame. From the front portions of the frame 8 guide loops 14 project upward and receive guide rollers 15 journaled on the inner sides of the frame 1.

For raising and lowering the frame 8 a lever 16 is mounted on the tongue and has a locking segment 17. The lever is fastened to a short rock shaft 18 which overhangs the frame 8 and has an arm 19 fixed to its inner end from which a link 20 depends to a point of pivotal connection with the frame 8. By the means just described the secondary frame may be adjusted as desired as will be self evident.

A pair of conveying belts 21 are mounted longitudinally of the frame 8 on each side of the center. Each belt has laterally extending fingers 22 on its upper portion only and they converge toward their rear ends. Between the belts is an adjustable bottom 23 having its forward end hinged on a bracket 24 mounted on the cross bar 25 of the frame 8. This bottom has an angular formation as shown in Fig. 4 and its rear end is supported by a link 26 projecting laterally and depending from a bell crank lever 27 mounted on a bracket 28. By swinging this lever the rear end of the bottom may be raised or lowered and the cut stalks delivered to the shocking platform (not shown) as desired. Each belt has a chain 29 (Fig. 5) on its inner face at its upper and lower edges and these chains run over sprockets 30 fixed on vertical shafts 31 at the front and like shafts 32 at the rear. These shafts have their upper end held in position by standards 33 mounted on the frame 8. The shafts 31 and 32 are supported by the parts 34, 35 and 36, as shown in Fig. 6.

On the inner end of the stub axle 3 a sprocket 37 is fixed and drives by means of a chain 38 a smaller sprocket 39 fixed on a transverse shaft 40 mounted in the frame 8; this chain has some slack and a belt tightener (not shown) may be used if necessary. The shaft 40 carries miter gears 41 meshing with pinions 42 mounted on the shafts 32 whereby the belts are driven. The shafts 31 drive, each a train of gears 43 mounted on the under side of the correlated member 9 and imparting motion to a universal shaft 44 driving a sprocket 45, which in turn drives a feed chain 46 over a second sprocket 47. The feed chains 46 are mounted in decks 48 which with the members 9 form the throat of the machine.

On the drive shaft 40 other bevel gears 50 are also mounted and mesh with pinions 51 on the rear ends of counter shafts 52.

These shafts 52 are supported in the parts 25 and 34 and carry bevel gears 54 at their forward ends. The gears 54 drive other gears 55 which in turn drive horizontal overlapping cutter-disks 56 supported on brackets 53 (Fig. 6) just under the belts at the forward end of the bottom as is best shown in Fig. 4.

In operation the stalks are received in the throat in the usual way and are cut by the disks, which will not choke like reciprocating cutters. The fingers 22 of the belts 21 carry the cut stalks up the incline of the bottom 23 and then convey them rearward for the next operation.

What I claim, is:

1. In a row binder, the combination with a supporting structure, of a pair of vertically disposed rearwardly traveling conveyer belts having fingers, the lower portions of the belt being free from fingers, and a bottom adjustably mounted between the lower portions of the belts.

2. In a row binder, the combination of a main frame, a secondary frame, a tongue rigidly secured to the main frame, an adjusting lever mounted on the tongue and connected with the secondary frame, a swivel connection suspending the rear end of the secondary from the main frame, cutters mounted on the secondary frame, conveyer belts mounted on the secondary frame, an adjustable bottom mounted between the belts, and mechanism for driving the cutters and the belts.

3. In a row binder, a support, a pair of vertical opposed belts extending longitudinally of the support, a bottom adjustable vertically between the belts, said belts having laterally extending fingers on the upper portion overhanging the bottom, the lower portions of the belts being free from the fingers to permit the bottom to be adjusted vertically therebetween.

In testimony whereof I affix my signature.

EDWARD J. GRUBEN.

Copies of this patent may be obtained for five cents each, by addressing the "Commissioner of Patents, Washington, D. C."